US012778157B2

(12) United States Patent
Wentzel et al.

(10) Patent No.: US 12,778,157 B2
(45) Date of Patent: Nov. 3, 2026

(54) HEAT RESISTANT CONFECTIONS

(71) Applicant: MARS, INCORPORATED, McLean, VA (US)

(72) Inventors: Joanna Wentzel, Elizabethtown, PA (US); Barry David Glazier, Elizabethtown, PA (US); Isabella Bernarda Maximilienne Van Damme, Slough (GB)

(73) Assignee: Mars, Incorporated, McLean, VA (US)

( * ) Notice: Subject to any disclaimer, the term of this patent is extended or adjusted under 35 U.S.C. 154(b) by 405 days.

(21) Appl. No.: 17/864,465

(22) Filed: Jul. 14, 2022

(65) Prior Publication Data

US 2022/0394993 A1 Dec. 15, 2022

Related U.S. Application Data

(63) Continuation of application No. 15/124,569, filed as application No. PCT/US2015/018092 on Feb. 27, 2015, now Pat. No. 11,406,115.

(Continued)

(51) Int. Cl.
*A23G 1/32* (2006.01)
*A23G 1/02* (2006.01)

(Continued)

(52) U.S. Cl.
CPC ................ *A23G 1/32* (2013.01); *A23G 1/02* (2013.01); *A23G 1/40* (2013.01); *A23G 1/50* (2013.01);

(Continued)

(58) Field of Classification Search
None
See application file for complete search history.

(56) References Cited

U.S. PATENT DOCUMENTS 1,364,192 A 1/1921 Friedman
1,768,230 A 6/1930 Borg (Continued)

FOREIGN PATENT DOCUMENTS

AR 078079 A4 10/2011
CA 2298199 A1 8/2000

(Continued)

OTHER PUBLICATIONS

"Determination of Total Fat Content in Chocolate and other Cocoa Derivatives". Available online at https://nmr.oxinst.com/assets/uploads/11_Determination_of_Total_Fat_Content_in_Chocolate_and_other_Cocoa_Derivatives.pdf) On May 3, 2016. (Year: 2016).*

(Continued)

*Primary Examiner* — Erik Kashnikow
*Assistant Examiner* — Assaf Zilbering
(74) *Attorney, Agent, or Firm* — Bookoff McAndrews, PLLC

(57) ABSTRACT

The present invention provides a heat resistant fat based confection wherein at least a portion of a natural and/or artificial sweetener or milk or cocoa solids component thereof has an average particle size of greater than 50 microns. Premixes are also provided including the unmilled sweetener or milk or cocoa solid and a polyol are also provided, and in those embodiments wherein the premixes are used to prepare the fat based confection, heat resistance of the same may be further enhanced. Methods of making the fat based confection, with or without using the premix, are also provided.

21 Claims, 2 Drawing Sheets

Related U.S. Application Data

(60) Provisional application No. 61/951,402, filed on Mar. 11, 2014.

(51) Int. Cl.
*A23G 1/40* (2006.01)
*A23G 1/50* (2006.01)
*A23G 3/36* (2006.01)
*A23G 3/50* (2006.01)

(52) U.S. Cl.
CPC ................ *A23G 3/36* (2013.01); *A23G 3/50* (2013.01); *A23V 2002/00* (2013.01)

(56) References Cited

U.S. PATENT DOCUMENTS 2,586,615 A 2/1952 Sherwood
2,626,216 A 1/1953 Sherwood
2,760,867 A 8/1956 Kempf
2,784,096 A 3/1957 Ciccone
2,863,772 A 12/1958 Kempf
2,904,438 A 9/1959 O'Rourke
2,951,763 A 9/1960 Keily
2,999,017 A 9/1961 Roederer
3,171,748 A 3/1965 Hendrik
3,218,174 A 11/1965 Gian-franco
3,491,677 A 1/1970 Bracco
3,634,106 A 1/1972 Organ et al.
3,638,553 A 2/1972 Kreuter
3,935,319 A 1/1976 Howard
4,041,188 A 8/1977 Cottier
4,045,583 A 8/1977 Jeffery
4,081,559 A 3/1978 Jeffery
4,098,913 A 7/1978 Baugher
4,157,405 A 6/1979 Itagaki
4,199,611 A 4/1980 Ito
4,446,116 A 5/1984 Krismer
4,446,166 A 5/1984 Giddey
4,664,927 A 5/1987 Finkel
4,705,692 A 11/1987 Tanaka
4,726,959 A 2/1988 Momura
4,837,041 A 6/1989 Maruzeni
4,839,192 A 6/1989 Sagi
4,847,105 A 7/1989 Yokobori
4,853,235 A 8/1989 Tomomatsu
4,855,152 A 8/1989 Nakano
4,873,109 A 10/1989 Tanaka
4,877,636 A 10/1989 Koyano
4,882,192 A 11/1989 Maeda
4,895,732 A 1/1990 Suwa
4,923,708 A 5/1990 Given
4,980,192 A 12/1990 Finkel
5,004,623 A 4/1991 Giddey
5,108,769 A 4/1992 Kincs
5,149,560 A 9/1992 Kealey
5,160,760 A 11/1992 Takemori
5,190,786 A 3/1993 Anderson
5,232,734 A 8/1993 Takemori
5,279,846 A 1/1994 Okumora
5,281,584 A 1/1994 Tobey
5,324,533 A 6/1994 Cain
5,326,581 A 7/1994 Higashioka
5,344,664 A 9/1994 Fitch
5,348,758 A 9/1994 Fuisz
5,409,726 A 4/1995 Stanley
5,424,090 A 6/1995 Okawauchi
5,431,947 A 7/1995 Bennett
5,431,948 A 7/1995 Cain
5,439,695 A 8/1995 Mackey
5,445,843 A 8/1995 Beckett
5,474,795 A 12/1995 Surber
5,476,676 A 12/1995 Cain
5,486,049 A 1/1996 Boatman
5,486,376 A 1/1996 Alander
5,505,982 A 4/1996 Krawczyk
5,523,110 A 6/1996 Mandralis
5,538,748 A 7/1996 Boatman
5,556,659 A 9/1996 De Pedro
5,626,900 A 5/1997 Miller
5,753,296 A 5/1998 Girsh
5,876,774 A 3/1999 Nalur
5,882,709 A 3/1999 Zumbe
5,902,621 A 5/1999 Beckett
5,928,704 A 7/1999 Takeda
5,965,179 A 10/1999 Ducret
6,001,399 A 12/1999 Kilibwa
6,010,735 A 1/2000 Frippiat
6,025,004 A 2/2000 Speck
6,051,267 A 4/2000 Jury
6,063,408 A 5/2000 Yamazaki
6,165,540 A 12/2000 Traitler
6,187,323 B1 2/2001 Aiache
6,251,448 B1 6/2001 DeStephen
6,258,398 B1 7/2001 Okada
6,451,122 B1 * 9/2002 Moraly .................... A23G 3/42
127/30
6,488,979 B1 12/2002 Davila
6,620,450 B1 9/2003 Davis
6,737,100 B1 5/2004 Matsui
6,773,744 B1 8/2004 Ward
6,783,783 B2 8/2004 Clark
6,805,889 B1 10/2004 Jury
6,841,186 B2 1/2005 Davila
6,875,460 B2 4/2005 Cunningham
7,427,420 B2 9/2008 Senba
7,579,031 B2 8/2009 Simbuerger
7,727,574 B1 6/2010 Ushioda
7,736,685 B2 6/2010 Parsons
7,811,621 B2 10/2010 Jury
7,935,368 B2 5/2011 Yamada
8,017,163 B2 9/2011 Simbuerger
8,088,431 B2 1/2012 Ward
8,231,923 B2 7/2012 Okochi
8,293,314 B2 10/2012 Bruese
8,323,015 B2 12/2012 Day
8,367,143 B2 2/2013 Clanton et al.
8,545,921 B2 10/2013 Gonus
8,607,980 B2 12/2013 Aldricge
8,790,737 B2 7/2014 Miguel
8,795,759 B2 8/2014 Cantz
8,802,178 B2 8/2014 Wang
11,582,983 B2 2/2023 Glazier et al.
2002/0011181 A1 1/2002 Cunningham
2002/0136818 A1 9/2002 Nalur
2004/0131752 A1 7/2004 Best
2005/0084598 A1 4/2005 Higaki
2005/0118327 A1 * 6/2005 Best ......................... A23G 1/36
426/660
2006/0210673 A1 9/2006 Petrofsky
2007/0048431 A1 3/2007 Budwig et al.
2007/0116853 A1 5/2007 Krohn
2007/0218167 A1 9/2007 Bhatia
2008/0241342 A1 10/2008 Pearson
2008/0248186 A1 10/2008 Bruse
2009/0317528 A1 12/2009 Abylov
2010/0015279 A1 1/2010 Zhang
2010/0123262 A1 5/2010 Keller
2010/0129519 A1 5/2010 Hennen
2010/0166911 A1 7/2010 Upreti
2010/0183772 A1 * 7/2010 Clanton .................. A23L 7/126
426/620
2010/0196550 A1 8/2010 Mussumeci
2010/0273873 A1 10/2010 Brys et al.
2010/0278977 A1 11/2010 Ervin
2010/0303987 A1 12/2010 Watts
2010/0323067 A1 12/2010 Hess
2011/0008521 A1 1/2011 Paggios
2011/0038995 A1 2/2011 Thulin
2011/0244082 A1 10/2011 Vaman
2011/0274813 A1 11/2011 Kowalczyk
2012/0058228 A1 3/2012 Wales
2012/0091132 A1 4/2012 Obolenski
2012/0100251 A1 4/2012 Baseeth
2012/0183663 A1 7/2012 Marangoni

(56) References Cited

U.S. PATENT DOCUMENTS

| | | | |
|---|---|---|---|
| 2012/0282375 | A1 | 11/2012 | Scavino |
| 2013/0264743 | A1 | 10/2013 | Urushidani |
| 2013/0292458 | A1 | 11/2013 | Cheema |
| 2014/0234492 | A1 | 8/2014 | Matsuura |
| 2014/0322391 | A1 | 10/2014 | Althaus |
| 2015/0237881 | A1 | 8/2015 | Glazier |
| 2015/0251844 | A1 | 9/2015 | Glazier et al. |
| 2015/0257407 | A1 | 9/2015 | Glazier et al. |
| 2016/0000113 | A1 | 1/2016 | Potter |
| 2017/0172172 | A1 | 6/2017 | Wentzel et al. |
| 2023/0210128 | A1 | 7/2023 | Glazier et al. |

FOREIGN PATENT DOCUMENTS

| | | | |
|---|---|---|---|
| CA | 2702493 | A1 | 11/2011 |
| CH | 399891 | A | 9/1965 |
| CH | 409603 | A | 3/1966 |
| CH | 410607 | A | 3/1966 |
| CH | 489211 | A | 4/1970 |
| CH | 519858 | A | 3/1972 |
| CH | 700968 | A1 | 11/2010 |
| CN | 1124096 | | 6/1996 |
| CN | 1889848 | | 1/2007 |
| CN | 1889848 | A | 1/2007 |
| CN | 101288414 | A | 10/2008 |
| CN | 101448414 | A | 6/2009 |
| CN | 101835386 | A | 9/2010 |
| CN | 101953425 | A | 1/2011 |
| CN | 102187930 | | 9/2011 |
| CN | 102423947 | A | 4/2012 |
| DE | 20202201 | | 6/2002 |
| EP | 0033718 | A2 | 8/1981 |
| EP | 0072785 | | 2/1983 |
| EP | 0189469 | | 8/1986 |
| EP | 0206850 | | 12/1986 |
| EP | 0322728 | | 7/1989 |
| EP | 0407347 | | 1/1991 |
| EP | 0426155 | | 5/1991 |
| EP | 0442324 | | 8/1991 |
| EP | 0637420 | A1 | 2/1995 |
| EP | 0688506 | | 12/1995 |
| EP | 0688506 | A1 | 12/1995 |
| EP | 0724835 | | 8/1996 |
| EP | 0958747 | | 11/1999 |
| EP | 1120455 | | 8/2001 |
| EP | 1288139 | | 3/2003 |
| EP | 1083043 | | 12/2004 |
| EP | 2030510 | | 3/2009 |
| EP | 2386206 | | 11/2011 |
| EP | 2567621 | A1 | 3/2013 |
| GB | 317335 | | 8/1929 |
| GB | 531386 | | 1/1941 |
| GB | 847340 | | 9/1960 |
| GB | 904197 | | 8/1962 |
| GB | 1219996 | | 1/1971 |
| GB | 1219996 | A | 1/1971 |
| GB | 1501484 | | 2/1978 |
| GB | 1538750 | | 1/1979 |
| GB | 2003912 | | 3/1979 |
| GB | 2028862 | | 3/1980 |
| GB | 2168071 | | 6/1986 |
| GB | 239148 | | 2/2004 |
| GB | 2391448 | | 2/2004 |
| GB | 2445539 | | 7/2008 |
| JP | S52-027887 | | 7/1977 |
| JP | S52-148662 | | 12/1977 |
| JP | S53-038665 | | 4/1978 |
| JP | S53-059072 | | 5/1978 |
| JP | S53-099362 | | 8/1978 |
| JP | S56-127052 | | 10/1981 |
| JP | S57-152852 | | 9/1982 |
| JP | S59-014752 | | 4/1984 |
| JP | S60-207549 | | 10/1985 |
| JP | S60-058052 | | 12/1985 |
| JP | S61-139338 | | 6/1986 |
| JP | S61-224935 | | 10/1986 |
| JP | S61-293344 | | 12/1986 |
| JP | S62-122556 | | 6/1987 |
| JP | S63-192344 | | 8/1988 |
| JP | S63-056250 | | 11/1988 |
| JP | H02-163039 | | 6/1990 |
| JP | H04-258252 | | 9/1992 |
| JP | H04-281744 | | 10/1992 |
| JP | H06-022694 | | 6/1994 |
| JP | H07-123922 | | 5/1995 |
| JP | H07-264981 | | 10/1995 |
| JP | H08-168343 | | 7/1996 |
| JP | H10-165100 | | 6/1998 |
| JP | 2000-109879 | | 4/2000 |
| JP | 2000-166475 | | 6/2000 |
| JP | 2002-209521 | | 7/2002 |
| JP | 2003-225055 | | 8/2003 |
| JP | 2004-298041 | | 10/2004 |
| JP | 2005-034039 | | 2/2005 |
| JP | 2006-109762 | | 4/2006 |
| RU | 2134041 | | 8/1999 |
| WO | WO 1991019424 | | 12/1991 |
| WO | WO 1992003937 | | 3/1992 |
| WO | WO 1993019613 | | 10/1993 |
| WO | WO 1996022696 | | 8/1996 |
| WO | WO 1999022605 | | 5/1999 |
| WO | WO 1999045790 | | 9/1999 |
| WO | 9965323 | A1 | 12/1999 |
| WO | WO 1999062497 | | 12/1999 |
| WO | WO 1999065323 | | 12/1999 |
| WO | WO 2003053152 | | 7/2003 |
| WO | WO 2006040127 | | 4/2006 |
| WO | WO 2007112077 | | 10/2007 |
| WO | WO 2008081175 | | 7/2008 |
| WO | WO 2008150169 | | 12/2008 |
| WO | WO 2009029577 | | 3/2009 |
| WO | WO 2010063076 | | 6/2010 |
| WO | WO 2011010105 | | 1/2011 |
| WO | WO 2011121337 | | 10/2011 |
| WO | WO 2011158014 | | 12/2011 |
| WO | WO 2012013348 | | 2/2012 |
| WO | WO 2012041629 | | 4/2012 |
| WO | WO 2012146920 | A1 | 11/2012 |
| WO | WO 2012146921 | A1 | 11/2012 |
| WO | WO 2013039831 | A1 | 3/2013 |
| WO | WO 2013039873 | A1 | 3/2013 |
| WO | WO 2013092643 | A1 | 6/2013 |
| WO | WO 2014052312 | A1 | 4/2014 |
| WO | WO 2014052421 | A1 | 4/2014 |
| WO | WO 2014052430 | | 4/2014 |
| WO | WO 2014149551 | | 9/2014 |

OTHER PUBLICATIONS

"Health Benefits of dark Chocolate". Available online at http://www.health-benefits-of-dark-chocolate.com/raw-cocoa-nibs.html on Jun. 28, 2009. (Year: 2009).*

Krapf et al., "Thermal Inactivation of *Salmonella* spp. during conching". Food Science and Technology xxx (2009) 1-4 (Year: 2009).*

Segur et al., "Sugar solubility sucrose and dextrose in aqueous Glycerol". Journal of Agricultural and Food Chemistry vol. 1, No. 8, Jul. 8, 1953, pp. 567-569. (Year: 1953).*

"Glycerin" . Available online at https://www.ams.usda.gov/sites/default/files/media/Glycerin%20Petition%20to%20remove%20TR%202013.pdf (Year: 2013).*

NPL Hill et al., "Understanding the Links Between Rheology and Particle Parameters". Available online at https://www.americanlaboratory.com/913-Technical-Articles/35729-understanding-the-Links-Between-Rheology-and-Particle-Parameters/ on Nov. 1, 2006 (Year: 2006).*

Oxford Instruments, Determination of Total Fat Content in Chocolate and other Cocoa, Determination of Total Fat Content in Chocolate and other Cocoa, Jul. 13, 2018, 1-3, US.

Stortz et al., Heat resistant chocolate, Trends in Food Science and Technology, vol. 22, No. 5, doi:10.1016/J.TIFS.2011.02.001, ISSN 0924-2244, (2011), pp. 201-214, (Feb. 11, 2011), 22, Trends in Food Science and Technology.

(56) References Cited

OTHER PUBLICATIONS

Anonymous, "GNPD—Milk Chocolate Bar with Sprinkles," Jan. 2014, p. 102, XP055452359, retrieved from the internet: URL<http://www.gnpd.com/sinatra/recordpage/2285064/from_search/B9in4hhrKV/?>.
Beckett, "The Science of Chocolate," The Royal Society of Chemistry, Cambridge, JK, 2nd Ed., 2008, Ch. 4, pp. 61-68.
Seguine, "Factors influencing the taste, selection, and specification of chocolate," 42nd PMCA Production Conference, 1988. pp. 56-61.
"Determination of Total Fat Content in Chocolate and other Cocoa Derivatives," Available online at https://nmr.oxinst.com/assets/uploads/11_Determination_of_Total_Fat_Content_in_Chocolate_and_other_Cocoa_Derivatives.pdf, on May 3, 2016.
European Examination Report in application No. 15709398.0, by Examiner Bjorn Groh, mailed Sep. 26, 2017, 11 pages.
European Extended Search Report in European Appln. No. 20209279.7, dated Mar. 12, 2021, 8 pages.
[No Author Listed], "Summary of Examples of EP 2900074 B1," filed on Sep. 3, 2020, in response to EP Communication Pursuant to Article 101(1), Rule 81(2), and to Patentee Response in EP Patent No. EP2900074, 1 page.
[No Author Listed], "Experimental Report Filed by Patent Proprietor," filed on Feb. 25, 2020, in response to EP Communication of Notice of Opposition Pursuant to Rule 79(1) EPC, 2 pages.
Almeida, et al., "Evaluation of the physical stability of two oleogels," International Journal of Pharmaceuticals, 2006, 327:73-77.
Beckett, Ed., Industrial Chocolate Manufacture and Use, 4th Ed., 2009, pp. 198-199 and 244-245.
Bourne, et al., "Texture profile analysis," Food Technology, 1978, 32:62-66.
Chocolate Specifications, The Gazette of India, Extraordinary, pp. 380-381, 484-486, Part III—Sec. 4, 2018.
Christensen, "Food Science: Why Chocolate Seizes," Apr. 2008, pp. 1-2, URL <https://www.thekitchn.com/food-science-why-chocolate-seizes-48510>.
CN Search Report for Appln. No. CN 201380050914, dated Dec. 7, 2016, 8 pages.
CN Second Search Report for Appln. No. CN 201380050914, dated Aug. 27, 2017, 2 pages.
CN Supplemental Search Report for Appln. No. CN 201380050914, dated Aug. 21, 2017.
Decision by Opposition Division in EP Patent No. 2900074, dated Dec. 10, 2021, 33 pages.
Dicolla, "Characterization of heat resistant milk chocolates," MS Thesis, Food Science, Pennsylvania State University, Feb. 26, 2009.
dictionary.com, "purity," printed Sep. 30, 2019 from URL <https://www.dictionary.com/browse/purity?s=t>.
EP Communication for EP Appln. No. 13774024.7, dated Feb. 28, 2017, 6 pages.
EP Communication for EP Appln. No. 13774024.7, dated Jul. 11, 2016, 11 pages.
Glazier, Barry D., "Declaration," filed on Aug. 19, 2021 in response to EP Summons to Attend Oral Proceedings in EP Patent No. EP2900074, 15 pages.
Goh, et al., "Determination of mono- and diglycerides in palm oil, olein, and stearin," JAOCS, 1985, 62(4):730-734.
International Preliminary Report on Patentability in PCT Appln. no. PCT/US2013/061645, Dated Mar. 31, 2015, 9 pages.
International Search Report and Written Opinion in PCT Appln. No. PCT/US2013/061400, dated Dec. 17, 2013, 14 pages.
International Search Report and Written Opinion in PCT Appln. No. PCT/US2013/061627, dated Dec. 17, 2013, 14 pages.
International Search Report and Written Opinion in PCT Appln. No. PCT/US2013/061645, dated Dec. 18, 2013, 12 pages.
Killian, "Development of water-in-oil emulsions for application to model chocolate products," May 2, 2012.
Lees, et al., "Sugar confection and chocolate manufacture," Leonard Hill, 1973, pp. 124-125.
Lucisano et al., "Influence of formulation and processing variables on ball mill refining of milk chocolate," European Food Research and Technology, Mar. 14, 2006, 223(6):797-802.
Martinez, "Influence of the concentration of a gelling agent and the type of surfactant on the rheological characteristics of oleogels," Il Farmaco, 2003, 58:1289-1294.
Minifie, "Chocolate, cocoa, and confectionery," 3rd Ed., Chapman and Hall, 1989, 139.
Minifie, "Chocolate, cocoa, and confectionery," 3rd Ed., Chapman and Hall, 1989, p. 111.
Minifie, "Chocolate, cocoa, and confectionery," 3rd Ed., Chapman and Hall, 1989, pp. 135-164.
Minifie, "Packaging in the Confectionery Industry," Chocolate, Cocoa, and Confectionery: Science and Technology, Chapman and Hall, Aug. 31, 1989, 3rd Ed., Chapter 22, pp. 709-769.
Mohos, Confectionery and Chocolate Engineering: Principles and Applications, 2010, pp. 26-27 and 46-47.
Notice of Opposition in EP Patent No. 2900074, dated Oct. 2, 2019, 25 pages.
Pagliaro et al., "Glycerol: Properties and Production," The Future of Glycerol, Royal Society of Chemistry, May 22, 2008, 1st Ed., Chapter 1, pp. 1-28.
Pfeiffer, et al., "The Art of French Pastry," Random House, 2013, p. 208.
Potter, "Food Science," 2nd Ed., The AVI Publishing Company, Inc., Westport, CT., 1973, 49-50.
pubchem.ncbi.nlm.nih.gov [online], "Compound Summary: Sorbitol," Sep. 16, 2004, retrieved on Oct. 28, 2025, retrieved from URL <https://pubchem.ncbi.nlm.nih.gov/compound/5780>, 146 pages.
Response filed by Opposition in EP Patent No. 2900074, response to EP Communication Pursuant to Article 101(1), Rule 81(2), and to Patentee Response, dated Sep. 3, 2020, 8 pages.
Response filed by Opposition in EP Patent No. 2900074, response to EP Summons to Attend Oral Proceedings, dated Aug. 18, 2021, 6 pages.
Response filed by Patentee in EP Patent No. 2900074, response to EP Communication of Notice of Opposition Pursuant to Rule 79(1) EPC, dated Feb. 25, 2020, 14 pages.
Response filed by Patentee in EP Patent No. 2900074, response to EP Summons to Attend Oral Proceedings, dated Aug. 19, 2021, 4 pages.
Schaefer, "Analysis of nonstarch polysaccharides in cocoa powder by a new micromethod," J. Agric. Food Chem., Nov. 1, 1983, 31:1375-1376.
Siew et al., "Diglyceride content and composition as indicators of palm oil quality," J. Sci. Food Agric., Sep. 1995, 69:73-79.
Stopsky, et al., "Chemistry of fats and by-products of processing raw fat materials", Moscow, Kolas, 1992, 153-154.
Stortz, et al., "Heat resistant chocolate," Trends in Food Science & Technology, 2011, 22:201-214.
Swern, "Bailey's industrial oil and fat products," 4th Ed., John Wiley and Sons, New York, 1979, 46-51.
Zhong, et al., "The Technology of Making Cakes and the Recipe", Chemical Industry Press, Mar. 2009, 46-47.

* cited by examiner

HEAT RESISTANT CONFECTIONS

CROSS-REFERENCE TO RELATED APPLICATIONS

This application is a Continuation of U.S. Non-provisional application Ser. No. 15/124,569, filed on Sep. 8, 2016, which is a U.S. National Stage under 35 U.S.C. § 371 of International Application No. PCT/US2015/018092, filed Feb. 27, 2015, which claims priority to U.S. Provisional Application No. 61/951,402, filed Mar. 11, 2014, all of which are incorporated herein by reference in their entirety.

FIELD

The present invention relates to heat resistant fat based confections comprising an unmilled granular component, and methods for making these.

BACKGROUND

Much of the desirable eating experience of chocolate confectionery is related to its ability to melt quickly and completely to provide the consumer thereof with a lubricious, indulgent eating experience. This ability, in turn, is often directly relatable to the use of cocoa butter as at least a portion of the fat component in the confection. With a sharp melting point very near 37° C., cocoa butter provides the desirable melting profile upon ingestion, and thus, a large component of the desired overall consuming experience.

However, what is a desirable trait from a consumer's perspective is not necessarily a positive attribute from a manufacturing, shipping and/or handling perspective. For example, the ability of chocolate confections to melt quickly and completely at 37° C. can become a product storage and quality concern, in particular in geographies where the environmental temperature averages at or above 37° C. These concerns may be exacerbated in regions where economic circumstances are not conducive to the wide spread use of refrigerated storage.

It would thus be desirable to provide heat resistant chocolate confections that provide the desired organoleptic experience, that are yet capable of substantially maintaining their shape and/or structure prior to consumption, i.e., during shipment, storage and/or other handling. Further advantages would be provided if the confections could be manufactured with little, or no, additional added expense, whether in the form of raw materials, capital equipment, or utility costs.

BRIEF DESCRIPTION

The present invention provides a heat resistant fat based confection. Unexpectedly, the heat resistance of the confection may be conferred, or enhanced, by at least a portion of a natural or artificial sweetner and/or milk or cocoa solids component thereof having an average particle size of 50 microns or greater. Such large particle sizes have conventionally been believed to contribute to a gritty or grainy mouthfeel or texture when included in fat based confections. Because many sweeteners and milk or cocoa solids are supplied with particle sizes above 100 microns, those materials have conventionally undergone particle size reduction techniques such as milling, grinding, etc. prior to inclusion in fat based confectionery. It has now been discovered that, in fact, not only does the inclusion of unmilled sweeteners and/or milk or cocoa solids not have such an effect, it surprisingly can increase the heat resistance of the fat based confection as compared to fat based confections including the same sweetener or milk or cocoa solids component milled to a smaller particle size. Since one or more milling/grinding/particle size reduction steps are thus excluded, time and/or capital cost savings may be provided.

In one aspect, a fat based confection is provided. At least a portion of one natural or artificial sweetner or milk solids component thereof has an average particle size of greater than 50 microns. Any sweetener or milk or cocoa solid can be used. Examples of sweeteners include, but are not limited to, natural and/or artificial sweeteners, including monosaccharides, such as dextrose, glucose, fructose, galactose, xylose; disaccharides like lactose, sucrose; polysaccharides of these, hydrates of these. In some embodiments, at least a portion of a monosaccharide used in the chocolate confection has an average particle size of greater than 50 microns, and in such embodiments, the monosaccharide may be dextrose, dextrose monohydrate, or a combination of these. Examples of milk or cocoa solids include nonfat solids, such as nonfat milk solids, defatted cocoa solids and the like, solids containing fat, such as fat containing milk solids, or combinations of any number of these.

The fat based confection is heat resistant, and in some embodiments, the heat resistance may be enhanced via the inclusion in the confection of a polyol, e.g., glycerin, sorbitol, maltitol, mannitol, xylitol, lactitol, isomalt, erythritol, or combinations of these. Indeed, in such embodiments, the heat resistance provided to the chocolate confection may be synergistically enhanced. In such embodiments, the unmilled component/polyol combination may be effective to replace any lactose that otherwise may typically be included in a similar confectionery, and in such embodiments, the confectionery may be substantially free of lactose.

Emulsifiers or other surface active agents may be used, and so, in some embodiments, the fat based confection comprises lecithin. The taste profile of the heat resistant fat based confection is surprisingly not significantly different from that of a conventional fat based confection, i.e., a confectionery comprising the same milled granular component, in an unmilled state.

Processes for making the fat based confections are also provided, wherein wherein at least a portion of a natural and/or artificial sweetener or nonfat solids component thereof is not subjected to a milling step prior to combination with any other component of the confection and/or has an average particle size of greater than 50 microns. In some embodiments of the process, no combination including the unmilled component is subjected to a milling step during the process, while other embodiments of the process do not comprise a milling step at all.

The heat resistance of the fat based confection may be even further enhanced by providing a premix of the sweetener or milk or cocoa solids having an average particle sizes of 50 microns, and a polyol. Surprisingly, the level of heat resistance provided to the resulting confection may be better than a fat based confection comprising the same sweetener or milk or cocoa solids having an average particle size of less than 50 microns, and the same polyol, when not provided as a premix. Or, the heat resistance may be approximately the same, but the texture of the confection prepared using the premix may be enhanced, e.g., smoother, than a confection prepared using the same sweetener or milk or cocoa solid and polyol not provided as a premix.

And so, in another aspect, a pre-mix for a fat based confectionery is provided. The premix comprises a sweetener or a milk or cocoa solids component, at least a portion of which having an average particle size of 50 microns, and a polyol. Fat based confections prepared from the premix are expected to be heat resistant to at least 37° C. Methods for making a fat based confection using the premix are also provided and comprise preparing a premix of the fat based confection comprising an amount of a sweetener or milk or cocoa solid having an average particle size of greater than 50 microns and a polyol and less than all other components of the fat based confection and mixing the premix with the remaining components to provide the fat based confection.

DETAILED DESCRIPTION

Figure 1A:
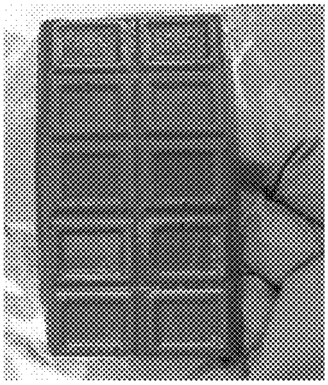
FIG. 1A shows a photograph of the tactile testing of a fat based confection according to one embodiment.

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms “first”, “second”, and the like, as used herein do not denote any order, quantity, or importance, but rather are used to distinguish one element from another. Also, the terms “a” and “an” do not denote a limitation of quantity, but rather denote the presence of at least one of the referenced item, and the terms “front”, “back”, “bottom”, and/or “top”, unless otherwise noted, are merely used for convenience of description, and are not limited to any one position or spatial orientation.

If ranges are disclosed, the endpoints of all ranges directed to the same component or property are inclusive and independently combinable (e.g., ranges of “up to 25 wt. %, or, more specifically, 5 wt. % to 20 wt. %,” is inclusive of the endpoints and all intermediate values of the ranges of “5 wt. % to 25 wt. %,” etc.).

Reference throughout the specification to “one embodiment” or “an embodiment” means that a particular feature, structure, or characteristic described in connection with an embodiment is included in at least one embodiment. Thus, the appearance of the phrases “in one embodiment” or “in an embodiment” in various places throughout the specification is not necessarily referring to the same embodiment. Further, the particular features, structures or characteristics may be combined in any suitable manner in one or more embodiments.

As used herein the term “heat resistant” means a fat based confection that retains its shape and/or can be handled without leaving a residue on the contacting surface after exposure to elevated temperatures, i.e., temperatures of at least 30° C., or 32° C., or 34° C., or 36° C., or even 37° C. or greater. Ways of measuring heat resistance can include rack testing and tactile testing. Rack testing is a method used to determine the extent to which a fat based confection retains its shape upon exposure to various temperatures and tactile testing is a method used to determine the extent to which a fact based confection can be handled without leaving a residue on a surface used to contact the fat based confection.

The phrase “fat based confection” means any confection including at least 17, or 20, or 23, or 25, or 27 or 29, or 30 or greater weight percent fat, from any source. In some embodiments, a fat based confection includes cocoa solids and/or cocoa butter/cocoa butter alternative.

As used herein the term “milling” means any treatment or process that modifies particle size and/or particle size distribution. Such treatments or processes can include, but are not limited to, media milling, ball milling, impact milling, hammer milling, pin milling, fluid energy milling, jet milling, classifier milling, air classifier milling, triple disc milling, gap milling, roll crushing, refining, roll refining, two-roll refining, three-roll refining, four-roll refining, and five-roll refining.

The present invention provides a heat resistant fat based confection. The heat resistance of the confection may be conferred by the inclusion of sweetener and/or milk or cocoa solids component, at least a portion of which has an average particle size of greater than 50 microns. It has now been surprisingly discovered that the inclusion of sweetener or solids component having such a particle size can provide the fat based confection with heat resistance, e.g., to a temperature of 37° C. or higher.

In many instances, the ability to use such components at a larger particle size than has been conventionally understood to be possible means that these components can be used directly as purchased, rather than being subjected to a particle size reduction step, by the confectionery manufacturer. Such techniques include any type of milling, including ball milling; any form of impact milling such as hammer and pin milling; disc milling; roll refining; or combinations of these as may be provided in classifier mills, etc.

Since the same is not required in connection with the sweetener or milk or cocoa solids component, at times herein the sweetener and/or solids component may be referred to as “unmilled”. Stated another way, the term “unmilled” may be used to describe the portion of sweetener or milk or cocoa solids having a particle size greater than 50 microns used in the confection and that have not been subjected to any processing technique that has, as its primary purpose, a reduction in the average particle size of the component or components subjected to the technique.

In some embodiments, the heat resistance of the fat based confection comprising the unmilled sweetener or milk or cocoa solids component may even be greater than that of the same confection prepared with the same component, milled. While not wishing to be bound by any theory, it is believed that by utilizing the sweetener or milk or cocoa solids in the confection in an unmilled state, the moisture inherently present in such components remains available to the confection for the formation of a heat resistant structure therein, rather than being lost in a milling step.

Further surprising is the fact that this benefit can be provided without the presence of the unmilled sweetener or milk or cocoa solids causing a gritty texture or mouthfeel in the fat based confection. Conventionally, these components of fat based confections have been milled to an average particle size of less than 50 microns, or less than 40 microns, or even less than 30 microns, in order to reduce the tendency of these components to provide the fat based confection with a gritty texture or mouthfeel. And so, it is unexpected that leaving such components unmilled, with a particle size of greater than 50 microns, would not result in a confection with an unacceptable texture or mouthfeel, much less provide any advantage to the confection. It is even less expected that fat based confections comprising an unmilled amount of sweetener or milk or cocoa solids would exhibit enhanced heat resistance as compared to a fat based confection having the same composition, and, milled.

In fact, fat based confections according to the invention may have a taste profile that is not statistically different from a conventional fat based confection comprising the same sweetener or milk or cocoa solids component, milled rather than unmilled A 'taste profile' may be measured, e.g., by a data series of multiple quantitative descriptive analysis (QDA) attributes, such as the Spectrum™ method.

Furthermore, the benefits provided by utilizing at least a portion of at least one sweetener or milk or cocoa solids component of the fat based confection in an unmilled state can extend beyond heat resistance and textural properties of the fat based confection. For example, some conventional heat resistant confections require the use of finely milled sweeteners, e.g., to a particle size on the order of nanometers, apparently under the assumption that such a small particle size will assist in the formation of a sugar lattice within the confection that will then impart some level of heat resistance. Not only can such milling equipment be expensive from a capital cost perspective, but it can also take up valuable manufacturing space and time. In contrast, the present fat based confections can avoid at least some of the time expense associate with such milling steps, and in some embodiments, may even avoid the purchase of additional equipment, and/or allocation of time and space resources.

Sweeteners suitable for use in fat based confections include any natural sugar, i.e., suitable sweeteners include sucrose, dextrose, galactose, fructose, lactose, maltose, corn syrup solids, isomers and other derivatives of these, and combinations of any number of these. Artificial sweeteners may also be utilized in fat based confections and examples of these include aspartame, acesulfame-k, cyclamates, saccharin, sucralose, nechesperidin, dihydrochalone, alitame, glycyrrhizin, or combinations of these. In some embodiments, the sweetener comprises sucrose, lactose, a monosaccharide such as dextrose, fructose, galactose, or combinations thereof.

In those embodiments wherein at least a portion of a sweetener is to be used in an unmilled state, the sweetener may desirably comprise a monosaccharide such as dextrose, fructose, galactose, polymeric forms of these, anhydrous forms of these, hydrates of these, or combinations of these. In some embodiments, the monosaccharide is desirably dextrose, dextrose monohydrate, anhydrous dextrose, or combinations of these. Of these, dextrose monohydrate and anhydrous dextrose are preferred, and dextrose monohydrate is particularly preferred.

Suitable milk or cocoa solids include skim and whole milk power, as well as fat filled milk powder, cocoa solids, combinations of these.

The unmilled particle size of exemplary suitable sweeteners are provided above, in Table 1, and as shown, can range from an average particle size of from 50 microns to over 2000 microns. When used in conventional fat based confections, such sweeteners would typically be milled to provide at least a 10 fold, or even 100 fold, reduction in particle size, or to a particle size of from 10 microns to less than 50 microns.

The unmilled average particle size of some of the various sweeteners or milk or cocoa solids components as commercially available and typically included in fat based confectionery are provided below.

| Material | Particle Size as purchased |
|---|---|
| Powdered Sugar | average of 60 microns |
| Ultrafine Sugar | Average of 160 micron |
| Caster Sugar | 150-450 micron |
| Extra Fine Sugar | 200-600 micron |
| Coarse Sugar | 800-2200 micron |
| Skim Milk Powder | 100 micron |
| Fat Filled Milk Powder | 230-250 micron |
| Whole Milk Powder | 160 micron |
| Sieved Lactose Monohydrate | 130 micron |
| Milled Lactose Monohydrate | 20-50 micron |
| Coarse Dextrose Monohydrate | 300 micron |
| Fine Dextrose Monohydrate | 100 micron |
| Extra Fine Dextrose Monohydrate | 50 micron |

In those embodiments wherein one or more sweeteners having an average particle size of greater than 50 microns is to be used, only a portion of one sweetener may be left unmilled, or all of that particular sweetener may be left unmilled, and other sweeteners may be used and may be milled or unmilled, or other sweeteners may be used which are liquid and thus, not typically subjected to milling, unless incidentally. For example, the fat based confection may comprise sweetening amounts of corn syrup, molasses or one or more sugar alcohols, such as glycerin, sorbitol, isomalt, lactitol, maltitol, mannitol, xylitol, erythritol, combinations of these, and the like.

Even though some sweeteners or milk or cocoa solids are commercially available in grades comprising particle sizes at least close to that desirably used in confectionery, those skilled in the art typically do not choose to purchase these grades of such components due to the handling difficulties they can present. For example, extra fine sweeteners, such as the dextrose monohydrate shown above, having an average particle size of e.g., 50 microns, would be expected to exhibit more clumping or less flowability than fine or coarse dextrose monohydrate due to static electricity and other surface interactions that can occur within a plurality of particles of this size.

And so, typically, manufacturers of conventional fat based confections have purchased the desired sweetener or milk or cocoa solid at a larger particle size and milled it to a particle size of less than 50 microns or 40 microns, or even less than 30 microns prior to inclusion thereof in the desired fat based confection. In the instance of some components, this can represent a reduction of the unmilled size by a factor of 10's or even 100's. See, e.g., Beckett, "The Science of Chocolate", The Royal Society of Chemistry, Cambridge UK, $2^{nd}$ Edition, Chapter 4, pages 61-68.

As used herein, the term "average" indicates the mean of the particle size, not the median.

In addition to the sweetener or milk or cocoa solids having an average particle size of less than 50 microns, the fat based confection may also comprise a polyol. In such embodiments, the heat resistance of the confection is expected to be further enhanced, at least additively, and perhaps even synergistically, as compared to a fat based confection comprising an unmilled sweetener or milk or cocoa solids alone. In embodiments wherein an amount of a sweetener or milk or cocoa solids having an average particle size of greater than 50 microns and a polyol are included in the fat based confection, the heat resistance of the confection may be even further enhanced by preparation of a premix comprising the unmilled sweetener or milk or cocoa solids and the polyol.

Advantageously, the polyol has a boiling point greater than 105° C. so that at least some portion, desirably a majority (greater than 50%), and more desirably substantially all (e.g., greater than 75 wt %, or 80 wt %, or 85 wt %, or 90 wt %, or 95 wt %, or even greater than 99 wt %), of the polyol will remain within the fat based confection during processing, including any curing period, thereof. Desirably the polyol will have a FEMA and/or GRAS designation, and may have a boiling point greater than 110° C., 120° C., 130° C., 140° C., 150° C., 160° C., 170° C., 180° C., 190° C., 200° C., 210° C., 220° C., 230° C., 240° C., 250° C., 260° C., 270° C., 280° C. or even 290° C. For example, suitable polyols that are believed to be capable of assisting in the formation of a heat resistant structure within the fat based confection and that will not evaporate during any curing thereof, include, but are not limited to, glycerin, sorbitol, maltitol, mannitol, xylitol, isomalt, lactitol and erythritol. Combinations of these are also suitable.

While isomers or derivatives, including hydrates, hydrolysates, and hydrogenates, of the polyol(s) may be used, the polyol need not be encapsulated, gelled, polymerized, or otherwise altered from its purchased state to be used in the fat based confections provided. Rather, the chosen polyol(s) may advantageously be used 'as is'.

In some embodiments, the polyol desirably comprises glycerin. Glycerin may be a particularly preferred polyol inasmuch as grades of glycerin are commercially available with very little water content, i.e., less than 5%, 4%, 3%, 2%, 1% or even less than 0.9%, or less than 0.8%, or less than 0.7%, or even less than 0.6%, or about 5% water or less. Glycerin can thus act as a 'solvent' for the sweetener(s) in a fat based confection without introducing the detrimental effects of water. The minimization of water in the fat based confection and/or premix, is desirable due to the deleterious effects water can have on the rheology and taste profile of the fat based confection. The presence of even small amounts of water also introduces the potential for microbial growth in the fat based confection.

Indeed, in embodiments wherein the fat based composition comprises the unmilled sweetener or milk or cocoa solids and a polyol, the fat based confections may advantageously comprise substantially no added water. In such embodiments, and although some components of the fat based composition may inherently include small amounts of water, so that the presence of small amounts of water, e.g., less than 1%, are unavoidable, fat based confections according to these embodiments do not have any water added thereto as free water. As a result, the fat based confections according to such embodiments have only that amount of water present in the other components utilized.

In such embodiments it is believed that the use of an unmilled amount of one or more sweeteners or milk or cocoa solids not only can act, or assist any other sweeteners or milk or cocoa solids to act, with the polyol to form a structure that imparts heat resistance to the confection, but the unmilled component may provide more water to the confection and any such lattice structure than the same component, milled. This is believed to be because milling sweeteners or milk or cocoa solids prior to their incorporation into fat based confections may result in the drying and/or substantial dehydration of the milled component so that any water that may have otherwise inherently been present in the unmilled component would be lost prior to its ability to facilitate the formation of the structure believed to impart heat resistance.

Conventional methods of providing heat resistance via formation of a lattice structure using bulk sweeteners, while generally inclusive of monosaccharides, are typically directed primarily at more conventionally utilized disaccharides, e.g., sucrose. Such conventional methods teach that the water (or other solvent) necessarily included in order to mobilize the bulk sweeteners in the fat based confections prepared thereby, must be removed for the bulk sweetener to form the structure thought to impart heat resistance. Such methods, and the confections prepared thereby, thus not only include amounts of water detrimental to processing, but also, amounts of water that may invite bacterial growth during the manufacturing process. Furthermore, confections with added water may typically not provide the taste and texture desired by consumers, and as a result, these products are not typically commercially successful.

In those embodiments wherein a polyol may desirably be included in the fat based confection, it may be desirable incorporate the polyol and/or unmilled granular component into the fat based confection via a premix. In such embodiments, the heat resistance and/or texture of the fat based confection may be improved, or further enhanced.

While not wishing to be bound by any theory, it is believed that, when so provided, the polyol may interact with the unmilled granular component and/or the unmilled granular component may assist with the dispersion of the polyol, or vice versa, within the fat based confection. Whatever the mechanism, it has been discovered that utilizing the premix provides a more heat resistant fat based confection, or a fat based confection with similar heat resistance, but improved organoleptic and/or rheological properties, than fat based confections comprising the same or similar ingredients that were not so prepared.

Although the word "premix" is used, no order is intended to be implied. That is, the combination of the unmilled granular component and the polyol need not be prepared prior to the combination of the remaining components. Rather, all that is required is that the unmilled granular component and the polyol be combined prior to this combination being incorporated into, or with, the remaining ingredients. So long as this is the case, it is believed that the premixed unmilled granular component and polyol will begin to form, or assist with the formation of, a heat resistant structure in the complete fat based confection.

In embodiments where a premix is used, the unmilled granular component and the polyol can be combined in a range of ratios. In some embodiments those ratios are calculating based on weight/weight percentages while in other embodiments, the ratios are based on molar equivalents.

Once all ingredients have been combined, whether with or without the premix, the fat based confection may become very viscous, i.e., the composition may exhibit reduced flow characteristics or enter a plastic phase for a time. And so, in some embodiments, advantage may be seen by continuing to mix the final composition until the composition has regained its ability to flow, i.e., until the apparent viscosity has reduced. Mixing may be low shear, such as via a planetary mixer, or may be high shear, as provided by a scraped surface heat exchanger. Additional mixing may be carried out after the apparent viscosity has reduced, and may be carried out either at high speed/shear or low speed/shear.

In order to ameliorate, or postpone at least a portion of, any such viscosity increase, in those embodiments wherein the fat based composition comprises the unmilled granular component and a polyol, one or both may be added either before or after tempering. That is, inasmuch as the addition of one or more polyols can have the affect of elevating the viscosity of the fat based confection, addition of at least the polyol, and in some embodiments, both the polyol and the unmilled granular component, can defer this effect until after the other processing steps. Because the fat based confection would have undergone conching at this point, and be at a processable viscosity, it is possible that the addition of the polyol and/or the unmilled granular component will not alter the viscosity, or alter it to such a degree, that the fat based confection becomes unworkable. It is also possible that the setting of the fat that occurs during tempering may provide a structure thought to impart heat resistance.

Advantageously and surprisingly, other than those embodiments of the confection that include a polyol, the heat resistance of the present fat based confections is provided by components conventionally used in the same, albeit in a different physical format, e.g., at least a sweetener, a fat component, and a nonfat solids component. That is, whereas conventional formulations for heat resistant confections may typically include additional ingredients that impart the heat resistance, e.g., such as gelling agents, including hydrocolloids, fibers, humectants, etc., the present fat based confections utilize known components, just in larger particle sizes. As such, the additional expense associated with the use of less conventional components, including initial cost, and potentially capital, utility and other implementation costs, is minimized or completely avoided.

The fat component of the fat based confection may typically be any animal or vegetable based fat, but may also be synthetic, if substantially similar to useful animal or vegetable fats. Desirably, the fat component will comprise cocoa butter, butterfat, cocoa butter replacers, cocoa butter equivalents, cocoa butter substitutes, animal fat, vegetable fat, or combinations of these.

Cocoa butter equivalents include illipe, Borneo tallow, tengkawant, palm oil, sal, shea, kokum gurgi and mango kernel. Cocoa butter substitutes include laurics, which may typically be based upon palm kernel oil and coconut oil, and non-laurics, which may include soya, cottonseed, peanut, rapeseed and corn oil. Suitable vegetable oils include many of the non-lauric cocoa butter substitutes, i.e., corn oil, cottonseed oil, rapeseed oil, and also include palm oil, safflower and sunflower oil. In some embodiments, the fat component comprises cocoa butter.

The fat based composition may further comprise an emulsifier. It bears noting, however, that in those embodiments wherein the fat based confections do not include any added free water, any emulsifier used in the fat based confection is more likely exerting a surface active effect than a true emulsification. That is, during confectionary manufacture, the sweetener and other solid particulates are desirably substantially all suspended in a continuous fat phase. The presence of surface active agents and/or emulsifiers facilitates the formation of fat phase that desirably coats the particulates in the confectionary formulation.

Many emulsifiers are known to those of ordinary skill in the art that are suitable for use in food, and any of these may be utilized. Suitable emulsifiers include, e.g., lecithin, including soy lecithin as well as lecithin derived from other vegetable sources, such as soybean, safflower, corn, etc., fractionated lecithins enriched in phosphatidyl choline, phosphatidyl ethanolamine, phosphatidyl inositol, or combinations of these, monophosphate derivatives or diacetyl tartaric acid esters of mono- and diglycerides (sometimes referred to as PMD/DATEM), monosodium phosphate derivatives of mono- and diglycerides of edible fats or oils, sorbitan monostearate, polyoxyethylene sorbitan monostearate, hydroxylated lecithin, lactylated fatty acid esters of glycerol and propylene glycol, polyglycerol esters of fatty acids, propylene glycol mono- and di-esters of fats and fatty acids, sucrose polystearate, ammonium phosphatide, sucrose polyerucate, polygylcerol polyricinoleate, and the like. Combinations of any number of these may also be used. Typically, such agents may be included in confections in amounts of less than 1 wt %, or more typically, from 0.1 wt % to 0.3 wt %, based upon the total weight of the fat based confection.

Whether prepared via a premix, or otherwise, once prepared, the fat based confection can be handled substantially the same fashion as any conventional fat based composition, and may remain flowable for between several hours and several days. During this time, the fat based confection may be tempered, deposited, molded, enrobed or used as a coating. Once allowed to age and stabilize during a curing period, the fat based composition develops heat resistance as defined herein.

The fat based confection may be a chocolate composition, such as a milk chocolate, a dark chocolate or a white chocolate. As used herein, the phrase "chocolate composition" is meant to indicate a composition that includes one or both of cocoa butter and/or cocoa solids, and is not necessarily limited to any legal definition promulgated by jurisdictions in which this application may be filed and prosecuted.

The fat based confection may be formed into any desired final format. For example, the fat based confection may be molded, enrobed, coated and or sprayed to provide a single serving piece or a multipiece bar or block, any of which may be multitextured or multiregioned, i.e., comprise additional confectionery components in addition to the fat based confection. In those embodiments wherein the fat based confection is used to provide such a multitextured confection, e.g., as by coating, panning spraying or enrobing, the fat based confection may be applied to a core. Any core may be coated, and examples of these include a grain, a nut, ground nut, nut meat, a cookie, a biscuit, caramel, nougat, a marshmallow, a meringue, a dry aerated mass, or combinations of these.

Prior to, during, or after curing and/or stabilization, the fat based confections may also desirably be packaged. Typically, confections may be packaged by forming a film, such as a plastic film, aluminum foil, paper or a combination thereof, into an envelope, which may be substantially tubular, around the confection and sealing the ends of the package which desirably extend beyond the end of the confection.

In some embodiments, the curing period that confers heat resistant can be from about 3 days to about 20 days while in other embodiments, the curing period can be from about 5 days to about 18 days while in still other embodiments, the curing period can be from about 12 days to about 15 days.

Example 1

DOVE milk chocolate (DMC) was mixed with a slurry of either 1) unmilled dextrose monohydrate (Mean particle size at d90 of 392 as measured by Malvern particle size analyzer)+glycerine (1:1, 2% of recipe) or 2) milled dextrose monohydrate (mean particle size of 14+/−4 microns)+glycerine (1:1, 2% of recipe). Bars were moulded and aged for at least 4 weeks. Heat robustness testing was performed on both sets of bars. DSMC with the slurry containing unmilled dextrose was more heat robust than DSMC with the slurry containing milled dextrose.

More specifically, 4900 g of DMC chocolate was measured into a mixing bowl using a weighing scale. The chocolate was transferred into a 10 lb sigma blade mixer, and tempered to a Tricor Temper Meter reading of 1.1+/−0.5. A slurry of 50 g of dextrose monohydrate (milled or unmilled) with 50 g glycerin (99.7%) purity was prepared in a mixing bowl. Each slurry was added to 4900 g DMC tempered chocolate in the sigma blade mixer and mixed for 2 minutes, or until the chocolate had a thick, paste-like consistency. The chocolate was immediately transferred to molds and refrigerated at about 50° F. for approximately 30 minutes and demolded. The molded chocolate was aged at ambient temperature for 4 weeks and then subjected to tactile and rack testing to determine heat resistance as follows.

Figure 1B:
FIG. 1B shows a photograph of the tactile testing of a conventional fat based confection.

Tactile testing at 38° C. showed that the DMC sample with the slurry containing unmilled dextrose monohydrate was more robust than the DMC sample with the slurry containing milled dextrose monohydrate. Although both samples received a tactile score of "4", the sample containing milled dextrose monohydrate was much softer and more flexible than the sample with unmilled dextrose monohydrate (FIGS. 1A and 1B). Lab taste tests of both chocolates established that unmilled dextrose could not be detected in mouthfeel.

Figure 2A:
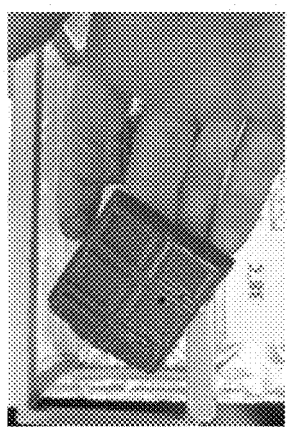
FIG. 2A shows a photograph of a fat based confection according to one embodiment after rack testing at 38° C.
Figure 2B:
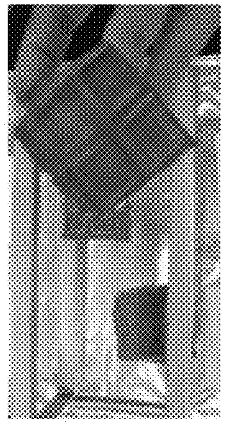
FIG. 2B shows a photograph of a conventional fat based confection after rack testing at 38° C.

In rack testing, bars prepared from the formulations are supported on a rack by the shortest dimensions thereof. Prepared bars had a thickness of from about 1/16" to about 3/4", or more typically, from 1/8" to about 1/2". Both bars with either unmilled or milled dextrose fell from the rack test between 30 and 45 minutes. However, the pieces that fell from the rack were softer in texture for the sample with milled dextrose monohydrate (FIGS. 2A and 2B), as seen in the tactile test.

Example 2

The following premixes are prepared, wherein all percentages are w/w:

| Ingredient | Ex. A | Ex. B | Ex. C | Ex. D | Ex. E | Ex. F | Ex. G | Ex. H |
|---|---|---|---|---|---|---|---|---|
| Dextrose Monohydrate #1 | 50% | | | | | | | |
| Dextrose Monohydrate #2 | | 60% | | | | | | |
| Lactose #1 | | | 60% | | | | | |
| Lactose #2 | | | | 75% | | | | |
| Lactose #3 | | | | | | | | |
| Sucrose #1 | | | | | 25% | | | |
| Sucrose #2 | | | | | | 50% | | |
| Sucrose #3 | | | | | | | | |
| Galactose #1 | | | | | | | 40% | |
| Galactose #2 | | | | | | | | 20% |
| Galactose #3 | | | | | | | | |
| 99% Glycerin | 50% | 40% | 40% | 25% | 75% | 50% | 60% | 80% |

Example 3

The following premixes were prepared using molar weight ratios (ME=molar equivalent):

| Ingredient | Ex. AA | Ex. BB | Ex. CC | Ex. DD | Ex. EE | Ex. FF | Ex. GG | Ex. HH | Ex. II |
|---|---|---|---|---|---|---|---|---|---|
| Dextrose Monohydrate #1 | 1 ME (1000 gm.) | | | | | | | | |
| Dextrose Monohydrate #2 | | 1 ME (1000 gm) | | | | | | | |
| Dextrose Monohydrate #3 | | | 1 ME (1000 gm) | | | | | | |
| Lactose #1 | | | | 1 ME (1818.2 gm) | | | | | |
| Lactose #2 | | | | | 1 ME (1818.2 gm) | | | | |
| Lactose #3 | | | | | | 1 ME (1818.2 gm) | | | |
| Sucrose #1 | | | | | | | 1 ME (1727.3 gm) | | |
| Sucrose #2 | | | | | | | | 1 ME (1727.3 gm) | |
| Sucrose #3 | | | | | | | | | 1 ME (1727.3 gm) |
| 99% Glycerin | 1 ME (464.7 gm.) | 2 ME (929.4 gm) | 3 ME (1394.1 gm.) | 1 ME (464.7 gm.) | 2 ME (929.4 gm) | 3 ME (1394.1 gm.) | 1 ME (464.7 gm.) | 2 ME (929.4 gm) | 3 ME (1394.1 gm.) |

In Example 2, Dextrose #1, Lactose #1, Sucrose #1, and Galactose #1 are unmilled and have particle sizes with means at d90 from about 100 microns to about 400 microns. Dextrose #2, Lactose #2, Sucrose #2, and Galactose #2 are unmilled and have particle sizes with means at d90 from about 60 microns to about 100 microns. Dextrose #3, Lactose #3, Sucrose #3, and Galactose #3 are milled to average particle sizes at d90 of from 10 microns to 50 microns.

Each pre-mix is prepared by blending with agitation at 30 C until homogeneous. Each premix is then blended with tempered DMC and mixed until homogeneous before being poured into molds and allowed to solidify. Rack and tactile testing will show that the chocolates prepared from premixes using Dextrose, Lactose, Sucrose and/or Galactose #1 or #2 are more heat resistant than chocolates prepared using Dextrose, Lactose, Sucrose and/or Galactose #3, while taste testing will show that the presence of the larger particle sizes was not detectable in the chocolates prepared from premixes using Dextrose, Lactose, Sucrose and/or Galactose #1 or #2.

In Example 3, Dextrose Monohydrate and Lactose was unmilled while Sucrose was milled. For premixes using unmilled Dextrose Monohydrate, spectroscopy results showed the premixes formed a network indicative of that conferring heat resistance to chocolate. However, the Lactose and Sucrose premixes either did not form a network or formed a network that was easily disturbed indicating a lesser ability to confer heat resistance.

The invention claimed is:

1. A premix for a fat based confection comprising:

particulate solids comprising dextrose monohydrate particles having an average particle size of greater than 50 microns; and a polyol comprising less than 5% water, wherein the ratio of dextrose monohydrate to polyol (w/w) is between 1:0.5 and 1:1.4.

2. The premix of claim 1, wherein the polyol has a boiling point of greater than 105° C.

3. The premix of claim 2, wherein the polyol comprises glycerin, sorbitol, maltitol, mannitol, xylitol, lactitol, isomalt, erythritol, or combinations of these.

4. The premix of claim 1, wherein the polyol comprises glycerin.

5. The premix of claim 1, comprising from 20 wt % to 75 wt % dextrose monohydrate and from 25 wt % to 80 wt % polyol.

6. The premix of claim 1, comprising from 1 molar equivalent dextrose monohydrate and from 1 to 3 molar equivalents polyol.

7. A fat based confection prepared from the premix of claim 1, wherein the fat based confection is heat resistant to 37° C.

8. A method of making a fat based confection comprising preparing the pre-mix of claim 1; and mixing the premix with remaining components of the fat based confection to provide the fat based confection.

9. The method of claim 8, wherein the polyol has a boiling point of greater than 105° C.

10. The method of claim 9, wherein the polyol comprises glycerin, sorbitol, maltitol, mannitol, xylitol, lactitol, isomalt, erythritol, or combinations of these.

11. The method of claim 10, wherein the polyol comprises glycerin.

12. The method of claim 8, wherein the mixing of the premix occurs at or after tempering.

13. The method of claim 8, wherein the mixing of the premix occurs after conching.

14. The method of claim 8, wherein the mixing of the premix does not reduce the particle size of the dextrose monohydrate particles.

15. The premix of claim 1, wherein the polyol has a boiling point of between 105° C. and 290° C.

16. The premix of claim 15, wherein the polyol has a boiling point of 290° C.

17. The premix of claim 1, wherein the dextrose monohydrate particles are unmilled.

18. The premix of claim 1, wherein the dextrose monohydrate particles have an average particle size of 60 microns to 100 microns.

19. The premix of claim 1, wherein the dextrose monohydrate particles have an average particle size of 100 microns to 400 microns.

20. The premix of claim 1, wherein the ratio of dextrose monohydrate to polyol (w/w) in the premix is 1:1.

21. The premix of claim 1, wherein the ratio of dextrose monohydrate to polyol (w/w) in the premix is 3:2.

* * * * *